United States Patent [19]

Freeman et al.

[11] 4,371,202

[45] Feb. 1, 1983

[54] LAMINATED CLEVIS PIN

[76] Inventors: Timothy J. Freeman, 3772 River La., Rocky River, Ohio 44116; William J. Goler, 4186 W. 192 Ct., Country Club Hills, Ill. 60472; Kenneth J. Humberstone, 3047 Lander Rd., Pepper Pike, Ohio 44124

[21] Appl. No.: 218,647

[22] Filed: Dec. 22, 1980

[51] Int. Cl.³ .................... B66C 1/34; F16G 15/00
[52] U.S. Cl. .................................. 294/82 R; 59/86; 59/93; 403/58; 403/79
[58] Field of Search ............. 294/78 R, 82 R; 24/116 R, 201 L; 59/84–88, 93, 95; 74/595; 248/278, 281.1; 403/58, 79

[56] References Cited

U.S. PATENT DOCUMENTS

| | | | |
|---|---|---|---|
| 1,083,661 | 1/1914 | Buckley | 59/85 |
| 2,419,923 | 4/1947 | Tolbert | 248/278 X |
| 2,422,844 | 6/1947 | Mullaney | 59/86 |
| 2,616,648 | 11/1952 | Budreck | 403/58 X |
| 3,468,123 | 9/1969 | Frye | 59/86 |
| 3,652,116 | 3/1972 | Pruitt | 294/82 R |
| 3,950,941 | 4/1976 | Ohrn | 59/86 X |
| 4,063,413 | 12/1977 | Benton et al. | 59/85 X |

FOREIGN PATENT DOCUMENTS 224689  11/1924  United Kingdom .................. 59/85

Primary Examiner—Johnny D. Cherry
Attorney, Agent, or Firm—Pearne, Gordon, Sessions, McCoy & Granger

[57] ABSTRACT

The invention relates to a clevis structure having transverse pins for a universal coupling effect. The structure is an assembly of mechanically interlocking components which can be individually fabricated and releasably joined without load carrying fasteners, welding, or the like. The components are readily fabricated even in relatively large sizes.

6 Claims, 3 Drawing Figures

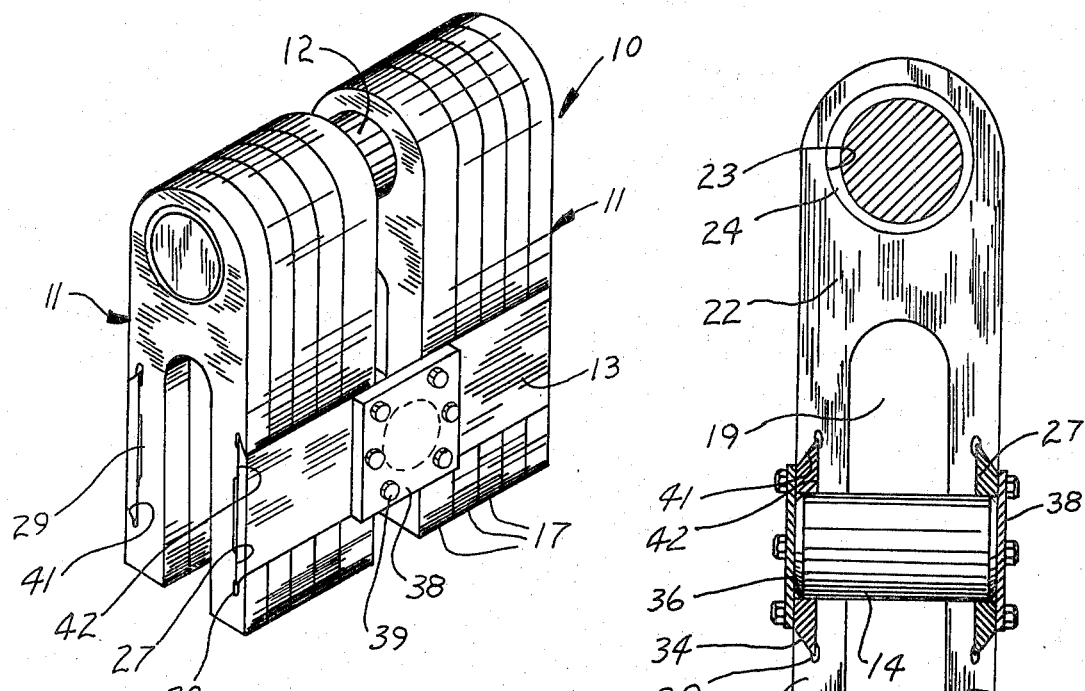
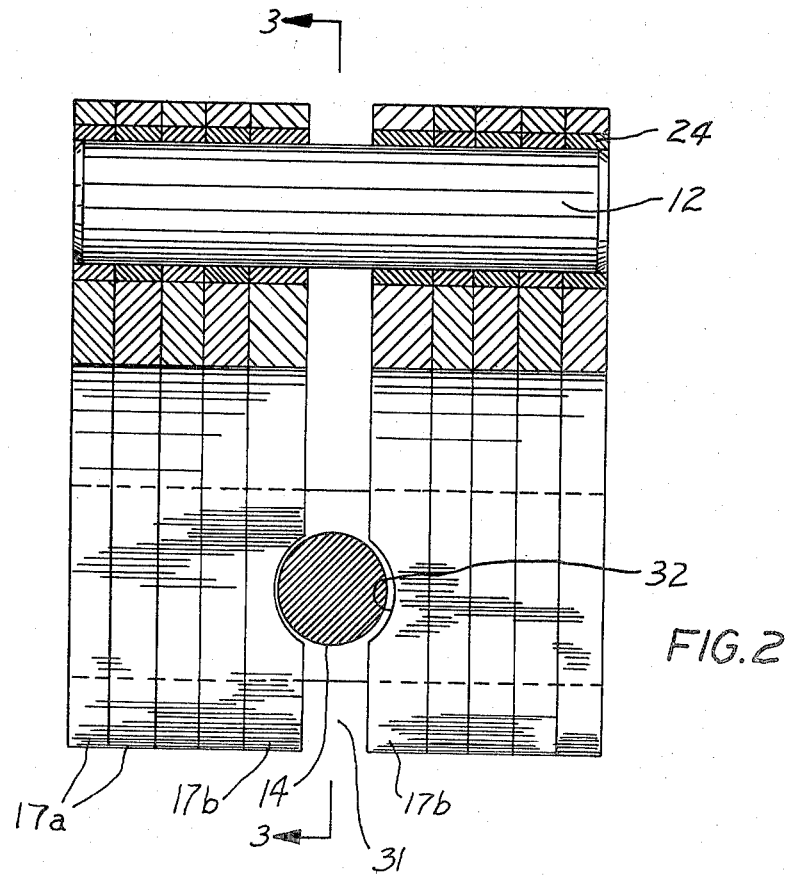

LAMINATED CLEVIS PIN

BACKGROUND OF THE INVENTION

The invention relates to a transverse pin clevis assembly of a type allowing universal movement between pin grappling elements and being particularly suited for fabrication into relatively large load capacity units.

Prior Art

A clevis with transverse pins can be used to provide pin joint loading in transverse planes in a system to avoid high bending stresses in associated structural elements. Clevises suitable for heavy material handling and the like have been fabricated primarily as forgings, castings, or weldments, depending on physical size, rated load capacity, service environment, production volume, fabrication facilities of a shop, and other factors. Often, the size of a clevis, dictated by its intended design capacity, is so huge that it is beyond the capabilities of otherwise favored forging, casting, or fabrication shops.

The particular application in which a clevis is employed may involve a degree of danger to health and/or property in the event of failure. In such circumstances, it may be customary, and even mandatory, to perform periodic inspections of all related structures to detect premature wear, stress or fatigue cracks and the like. In many instances, particularly where weldments are involved, it may not be possible to detect internal faults in a structure during such inspections. When a defect or a possible defect is uncovered or surmised in a monolithic structure, it is often necessary to discard the entire structure and replace it with a new unit because the defective or suspected area cannot itself be replaced or separately repaired. The safety-related problems are particularly acute in the steel making and processing industry, for example, where loads are extremely high, environmental temperatures affect the serviceability of materials and designs, and the potential danger to personnel and property in the event of failure can be catastrophic.

SUMMARY OF THE INVENTION

The present invention provides a clevis formed as a mechanical assembly of readily fabricated separate parts. The clevis assembly comprises two principal sets of mechanically interlocked components. The first set takes the form of two spaced carrier units strung on a first pin, while the second takes the form of a pair of spreader bars extending between the carrier units. A second pin, transverse to the first pin, is held in aligned holes in the spreader bars.

In the disclosed embodiment, the carrier units are formed as a stack or lamination of separately formed plates. The thickness of the individual laminations may be selected at least in part on the basis of the manner of their fabrication. Where, a disclosed, the laminations have a somewhat irregular profile, such laminations can be successfully formed by flame cutting flat steel stock. As further disclosed, the profile of the carrier unit laminations is arranged to mechanically interlock with the spreader bars to effect and maintain proper relative orientation between these parts without the necessity for significant additional fastener elements or resort to welding.

BRIEF DESCRIPTION OF DRAWING

FIG. 1 is perspective view of a clevis assembly constructed in accordance with the invention;

FIG. 2 is a longitudinal cross-sectional view of the clevis assembly taken in a plane along a primary pin of the assembly; and FIG. 3 is a transverse view of the clevis assembly taken in the plane indicated by the line 3—3 in FIG. 2.

DESCRIPTION OF PREFERRED EMBODIMENT

Referring now to the Figures, a clevis assembly 10 includes a pair of carrier units 11 strung on a primary pin 12, a pair of spreader bars 13 engaged with the carrier units, and a secondary pin 14 carried on the spreader bars.

In accordance with the invention, the carrier units 11 may be identical in construction and may each be formed of a plurality of separate laminations 17a, 17b, each strung on a pin 12. In the illustrated case, the laminations have substantially the same profile when viewed in the plane of their broad faces. Each lamination 17 is a generally planar body having a U-shaped symmetrical configuration. The legs, designated 18, of the laminations are spaced from one another by a gap 19 and are joined by an integral web 22. The web 22 is formed with a circular hole 23 sized to receive an associated bushing 24 with a press fit. The length of each bushing 24 corresponds to the thickness of the individual lamination 17a, 17b.

At their sides and generally at their midlength, the legs 18 are formed with undercut slots 27 as shown, for example, in the manner of a dovetail. Relief areas 28 in the corners of the slots 27 may be provided to reduce stress concentratons and provide tool clearance for finishing surfaces of the slots. To reduce friction, and thereby facilitate insertion of the spreader bars 13 into the slots 27, additional relief areas 29 may be provided in the slots 27.

With reference to FIG. 2, the separate laminations 17a, 17b may vary in relative thickness, depending on their position, and therefore their functions, in the stack making up the respective carrier unit 11. For example, the innermost laminations 17b of each unit 11 adjacent a gap 31 between units are shown with a thickness relatively greater than that of the remaining laminations 17a. This increased thickness keeps the gap 31 relatively narrow while affording adequate wall thickness (approximately equal to the thickness of the remaining laminations 17a) in the area of a cylindrical recess that provides clearance for the secondary pin 14.

The spreader bars 13 in the illustrated embodiment are generally flat plates of substantially identical construction. The length of the spreader bars 13 as well as the primary pin 12 is generally equal to the sum of the lengths of the carrier units 11 and the intervening gap 31. The width of the spreader bars 13, determined by their beveled edges 34, is substantially equal to the width of the undercut slots 27, thereby permitting the spreader bars to be assembled on the carrier units by longitudinally moving the bars progressively through the associated channels collectively formed by the individual lamination slots 27. Substantially at midlength, a spreader bar 13 is provided with a through crosshole 36 in which is received an end of a second crosspin 14. As shown, the thickness of a spreader bar 13 is generally equal to the minimum depth of the lamination slots 27 and the length of the secondary pin 14 is generally equal to the width of the laminations 17a, 17b, so that in assembly, this secondary pin is supported across the full thickness of each of the spreader bars.

The secondary pin 14 in the illustrated case is retained by a pair of plates 38, one on each of the outer faces of the spreader bars 13, and covering the crossholes 36. The plates are removably secured to the spreader bars 13 by bolts 39 threaded into the spreader bars. Other means for retaining the secondary pin 14 in position, such as setscrews, cotter keys, and other conventional means, are contemplated.

The various elements of the clevis assembly 10 can be fabricated from a variety of materials, both metal and nonmetal, depending on design load, operating environment, type of service and the like. In heavy material handling, the elements can be fabricated from a variety of steels ranging from plain carbon steels, such as ASTM A36, to high quality alloys such as ASTM514,517 or 469.

The disclosed clevis assembly 10 is particularly suitable for applications involving exceptionally large loads such as are involved in material handling in steel mills and the like. For example, the clevis assembly 10 may be used in the system disclosed in U.S. Pat. No. 3,802,730 to Hough by substituting it for the hook support element designated by the numeral 33 in such patent. The particular suitability of the disclosed clevis assembly 10 for a large load capacity applications is derived from its multi-part structure. Each element of its structure can be of a size which is readily fabricated in shops of limited fabrication capacity. While the individual parts are relatively small, and therefore are readily fabricated, they each cooperate with the others to achieve a high load capacity. The U-shaped laminations can be conveniently and economically fabricated by flame-cutting them from flat steel stock. In one assembly designed with a 6:1 safety factor and rated at 215 tons capacity, by way of example, a nominal thickness of two inches in the majority of laminations 17a is used. The primary and secondary pins 12, 14, have diameters in the order of 12 inches. Where the U-shaped laminations 17 are flame-cut, the undercut surfaces, designated 41, and spreader bar contacting surfaces, designated 42, can be finished by secondary machining operations.

The disclosed mechanical assembly of the various parts of the clevis 10 avoids weldments and their attendant uncertainties. Furthermore, the disclosed structure can be disassembled for full inspection of all of the individual components. Any parts which evidence premature wear or questionable structural integrity may be replaced without requiring all of the remaining parts to be discarded. Another important advantage of the laminated structure over a monolithic structure is that any structural fault occurring in one of the laminations cannot readily propagate through the associated remaining laminations. Still another advantage of the lamination structure is that the bushings 24 associated with the primary pin holes 23 are much easier to press in or out for assembly or replacement than would be a single bushing running the full length of a carrier unit 11.

In should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A clevis holding a pair of pins, away from their midlengths, in perpendicular planes, the clevis including a pair of apertured units being assembled on a first of said pins by receiving end portions of said first pin in their respective apertures, a pair of spaced spreader bars parallel to said first pin disposed on opposite sides of said units, said spreader bars each having an aperture aligned with that of the other and in the plane of the midlength of said first pin, a second pin having its end portions supported in said spreader bar apertures, said units and spreader bars being constructed and arranged in a manner whereby said pins when received in their respective apertures are sufficiently unobstructed at their midportions to receive a hook or like device for transmitting loads between said pins, said units each being formed by a plurality of separate laminations stacked in planes perpendicular to said first pin, said spreader bars engaging each of said laminations in a manner which permits loading on said pins to be distributed to each of said laminations.

2. A clevis as set forth in claim 1, wherein said unit laminations are substantially identical in profile when viewed in a direction corresponding to the axial direction of said first pin.

3. A clevis as set forth in claim 2, wherein said unit laminations each include a recess on each side of its profile collectively forming channels for reception therein of said spreader bars.

4. A clevis for coupling a pair of pins in spaced transverse relation with their midportions sufficiently free of obstruction to permit coupling of each pin with a hook or like device extending in opposite directions away from the clevis and including a first pin and a pair of carrier units spaced from each other in the longitudinal direction of the first pin, the length of the first pin being approximately equal to the sum of the lengths of the carrier units and the gap between said units, said carrier units each comprising a plurality of laminations of substantially identical profile at their broad faces, each lamination having a generally U-shaped configuration symmetrical about a midplane and including a pair of legs integrally joined by a common web, the web of a lamination having a through hole with the axis thereof centered on its midplane, the outer sides of the legs having an undercut slot, the holes of the laminations collectively forming a circular bore for reception of a first cylindrical pin, the slots of the lamination legs collectively forming on each side of a carrier unit a channel, a spreader bar disposed in each of said slot-formed channels, said spreader bars having a length generally equal to that of the first pin and a cross-sectional profile complementary to the undercut configuration of said slots whereby said spreader bars are capable of assembly into said channels by translational movement along their longitudinal axes in a direction parallel to said first pin and are restrained against movement laterally with respect to their longitudinal axes, said spreader bars each having a crosshole substantially at their midlengths, the crossholes of the spreader bars being coaxially aligned with one another and at the midplane in the gap between said carrier units, a second pin disposed in said crossholes, said gap between said carrier units, spacing between said pins, and clearance between the legs of individual laminations being sufficient to allow a hook or other device to grapple each of said pins from opposite directions such that said clevis is capable of transmitting a tension load from one such device to the other.

5. A clevis as set forth in claim 4, including means to restrain said second pin in said crossholes against movement along its axis.

6. A clevis as set forth in claim 5, wherein said restraining means is removably secured to said spreader bars.

* * * * *